United States Patent
Yuan et al.

(10) Patent No.: US 12,010,320 B2
(45) Date of Patent: Jun. 11, 2024

(54) ENCODING OF MODIFIED VIDEO

(71) Applicant: Axis AB, Lund (SE)

(72) Inventors: Song Yuan, Lund (SE); Viktor Edpalm, Lund (SE); Lars Branzén, Lund (SE)

(73) Assignee: AXIS AB, Lund (SE)

( * ) Notice: Subject to any disclaimer, the term of this patent is extended or adjusted under 35 U.S.C. 154(b) by 308 days.

(21) Appl. No.: 17/552,616

(22) Filed: Dec. 16, 2021

(65) Prior Publication Data

US 2022/0201312 A1 Jun. 23, 2022

(30) Foreign Application Priority Data

Dec. 23, 2020 (EP) ..................................... 20216915

(51) Int. Cl.
*H04N 19/136* (2014.01)
*H04L 9/08* (2006.01)
*H04L 9/32* (2006.01)
*H04N 19/172* (2014.01)

(52) U.S. Cl.
CPC ......... *H04N 19/136* (2014.11); *H04L 9/0825* (2013.01); *H04L 9/3236* (2013.01); *H04L 9/3247* (2013.01); *H04N 19/172* (2014.11)

(58) Field of Classification Search
CPC ..................... H04N 21/23424; H04N 21/2351
See application file for complete search history.

(56) References Cited

U.S. PATENT DOCUMENTS

| | | | |
|---|---|---|---|
| 2010/0008416 A1 | 1/2010 | Ben Zedeff et al. | |
| 2017/0076572 A1 | 3/2017 | Rao | |
| 2017/0223081 A1* | 8/2017 | Degrange | H04N 21/44004 |
| 2018/0014041 A1* | 1/2018 | Chen | H04L 65/612 |
| 2020/0127846 A1 | 4/2020 | Schneider et al. | |

FOREIGN PATENT DOCUMENTS

| | | |
|---|---|---|
| EP | 3591972 A1 | 1/2020 |
| EP | 3672244 A1 | 6/2020 |
| WO | 2016/180486 A1 | 11/2016 |

OTHER PUBLICATIONS

Extended European Search Report dated May 3, 2021 for European Patent Application No. 20216915.7.

(Continued)

*Primary Examiner* — Jerry T Jean Baptiste
(74) *Attorney, Agent, or Firm* — Volpe Koenig

(57) ABSTRACT

A method of processing a video stream comprises receiving a first/second set of input image frames comprising image data originating from a first/second source of input image frames; encoding the sets of input image frames into first/second sets of encoded image frames, forming a combined video stream, wherein an encoded image frame of the first set of encoded image frames exclusively references one or more other encoded image frames of the first set of encoded image frames, and an encoded image frame of the second set of encoded image frames references both an encoded image frame of the first set of encoded image frames and another encoded image frame of the second set of encoded image frames; and signing, using a first/second key, a first/second signing group comprising one or more encoded image frames of the first/second set of encoded image frames, wherein each key pertains to the respective source.

14 Claims, 5 Drawing Sheets

(56) References Cited

OTHER PUBLICATIONS

Sun et al., "A Secure and Robust Authentication Scheme for Video Transcoding," in IEEE Transactions on Circuits and Systems for Video Technology, vol. 16, No. 10, pp. 1232-1244 (Oct. 2006).
Schwarz et al., "Overview of the Scalable Video Coding Extension of the H.264/AVC Standard," in IEEE Transactions on Circuits and Systems for Video Technology, vol. 17, No. 9, pp. 1103-1120, (Sep. 2007).

* cited by examiner

ENCODING OF MODIFIED VIDEO

FIELD OF INVENTION

The present invention relates to methods and devices for encoding modified video.

TECHNICAL BACKGROUND

Today, surveillance video cameras see widespread use in a plethora of applications related to security, safety, and evidence gathering. Commonly, the video streams of these cameras are modified by, e.g., the application of graphical overlays. Such modifications may, e.g., include overlays showing the time of capture and/or a camera identifier. The modifications may further include bounding boxes and/or event markers. The modifications may thus be applied in order to aid an operator viewing the video stream in interpreting or understanding its contents. Modifications may also be applied in order to comply with legal requirements for protection of personal information with a notable example of such modifications being privacy masks.

Convincingly modified and/or computer-generated video, e.g., so-called deep fakes, present a huge security challenge, as it could, e.g., erode the evidentiary value of captured video and lead to surveillance cameras becoming less useful as trust in the captured video is diminished. This is especially true for the case of surveillance camera video that has been modified for non-malicious purposes as described above. In response to this modified video and unmodified video may be encoded and processed independently from each other.

In light of this, there is thus need for improvements within the technical field.

SUMMARY

Mitigating some of the issues in the prior art and providing improved solutions for encoding modified captured video would be beneficial.

According to a first aspect, there is provided a method of processing a video stream comprising receiving a first set of input image frames comprising image data originating from a first source of input image frames; receiving a second set of input image frames comprising image data originating from a second source of input image frames; encoding the first set of input image frames and the second set of input image frames into, respectively, a first set of encoded image frames and a second set of encoded image frames, forming a combined video stream, wherein an encoded image frame of the first set of encoded image frames exclusively references one or more other encoded image frames of the first set of encoded image frames, and wherein an encoded image frame of the second set of encoded image frames references both an encoded image frame of the first set of encoded image frames and another encoded image frame of the second set of encoded image frames; signing, using a first key, a first signing group comprising one or more encoded image frames of the first set of encoded image frames, wherein the first key pertains to the first source of input image frames; and signing, using a second key, a second signing group comprising one or more encoded image frames of the second set of encoded image frames, wherein the second key pertains to the second source of input image frames.

"Encoding" should be understood as known in the field of video coding, which may, for example, comprise representing the input image frames in a bitstream, possibly as compressed.

"Referencing" should be understood as generally known in the field of video coding, wherein, parts of a frame as encoded may potentially reference other parts of the same frame, and/or wherein each encoded image frame potentially may reference other image frames in the encoded video stream. Typically, encoding of a first frame, or a part thereof, may be based on encoding a difference with respect to a second frame, or a difference from a predicted evolution from the second frame, the first frame as encoded thereby referencing the second frame. This includes the case of so-called inter frame coding.

"Signing" should be understood, as generally known in the field of computer cryptography, as creating a representation, such as a collection of bits or bytes, a string of characters, or the like, indicating the identity of the key used during signing. Thus, the first and second keys may be understood as cryptographic type keys that enable identification of the source they are associated with.

A "key" should be understood, as generally known in the field of computer cryptography, as any representation, such as a collection of bits or bytes, a string of characters, or the like, used during signing. In the case of public key cryptography, as known per se, the key may be a private key, used in signing as claimed, and have a corresponding public key, which later may be used for verifying a signature produced during the signing.

The first set of input image frames may, for example, be image frames comprising only original pixel data, such as recorded by an image sensor of a capturing device. The second set of input image frames may, for example, be understood as image frames including modifications or changes compared to the original pixel data. The first source of input image frames may be associated with a capturing device, or an image sensor thereof. Alternatively, or additionally, the first source of image frames may be associated with stored video data, such as video data stored in a video store. The second source of input image frames may be associated with a video processing unit, i.e., an entity able to perform processing and apply modifications to image frame pixel data.

In general, the sources may be hardware-based, e.g., an image sensor or encoder, and/or software-based, e.g., as instructions stored on a non-transitory computer-readable storage medium.

The signing may, for example, be done at a separate signing unit, at the encoder, or elsewhere.

Encoding a combined video stream, so that a frame of the first set of encoded image frames exclusively references one of more frames of that set, while an encoded frame of the second set of encoded image frames references both a frame of the first set and a frame of the second set, allows for providing the full information from both sources in a single video stream, without permanently or irrevocably altering the original pixel or image data from the first source of input image frames, which thus may be effectively included in the output combined video stream, without modifications to their pixel data. Furthermore, using this way of encoding, the original image data in the first set of encoded image frame may be used as a basis for encoding the second set of image frames in the combined video stream, avoiding reduplication of data. Hereby, excessive encoding, transmission, and storage resources for two complete video streams, as unmodified, and as modified, can be avoided.

Furthermore, through the separate signing of a first signing group comprising one or more image frames of the first set of encoded image frames, and a second signing group comprising one or more image frames of the second set of image frames, each with a key pertaining to the respective source of image frames, the integrity of the images from the first source may be verified through the signature, despite the presence of the images, such as the overlay, from the second source. Moreover, the integrity of the images of the second source may be separately verified.

Commonly, data from the first source of input image frames may be associated with a relatively higher security level and data from the second source of input image frames may be associated with a relatively lower security level. For example, in the case of the first source of input image frames representing input image frames coming directly from an image sensor, and the second source of input image frames being associated with an overlay, which may be added in a camera downstream of the video sensor, the data directly from the sensor may have had less opportunity for tampering, as compared to the overlay, and therefore be associated with a higher level of trust. Further, the first set of input image frames may be guaranteed not to have been changed or tampered with since leaving the sensor, while the second set of input image frames can only be guaranteed not to have been tampered with since leaving the camera.

In another example, the separate signing may be particularly useful if the second source of input image frames, for instance comprising pixel data modifications, are associated with, or originating from, another party not necessarily being related to the provider of the encoder or capturing device. In this case, the corresponding data may be associated with a lower level of trust, as it is possible that data from such another party is not under control of the camera manufacturer or camera owner and may have been modified or tampered with before or during the addition.

Through the separate signing, the higher level of trust associated with the first source of image frames may be preserved, even in the presence of data from the second source of image frames, such as in the form of an overlay. Thus, security is improved while keeping all image information in one combined video stream.

Thus, in summary, the method may advantageously provide a secure and efficient way to encode video with modifications.

The second signing group may further comprise one or more encoded image frames of the first set of encoded image frames referred to by an encoded image frame of the second set of encoded image frames. This allows for verifying the combination of images from the first source, including modifications from the second source, improving security and flexibility.

The method may further comprise receiving a third set of input image frames comprising image data originating from a third source of input image frames, wherein the encoding further comprises encoding the third set of input image frames into a third set of encoded image frames, forming part of the combined video stream, wherein an encoded image frame of the third set of encoded image frames references both an encoded image frame of the first set of encoded image frames and another encoded image frame of the third set of encoded image frames, the method further comprising signing, using a third key, a third signing group comprising one or more image frames of the third set of encoded image frames, wherein the third key pertains to the third source of input image frames.

The third set of input image frames may, for example, in a similar manner to the second set of input image frames, comprise image frames including modifications or changes compared to the original pixel data from the first source. As an example, the second source may be understood as a source of pixel data modifications that are directly associated with an encoder or capturing device and that are overseen or sanctioned by a provider of said encoder or capturing device. The third source may be understood as a source of pixel data modifications that are instead associated with another party not necessarily being related to the provider of the encoder or capturing device.

The third set of input image frames may enable the addition of a further level of independent and separate pixel data modified image frames to be encoded into the same combined video stream without permanently and irrevocably altering the original pixel data. In principle there is nothing preventing further sets of image frames, e.g., fourth, fifth, etc., to be correspondingly received and encoded into the same combined video stream.

The method may further comprise designating the first set of encoded image frames as image frames not to be displayed. Such a designation may for the example take the form of an ND (No Display) flag applied to each frame of the first set of encoded image frames.

This allows for convenient and efficient way of identifying images frames comprised in the first set of encoded image frames, as signed by the first key, to be identified in the combined video stream. It should be noted that such a designation, in the present disclosure, may be used for identifying the first set of encoded image frames in the combined video stream even if the combined video stream is not displayed at an actual display.

Moreover, the combined video stream may hereby be encoded so that a standard video decoder, when decoding the combined video stream, will output a decoded video stream, for example for display, storage and/or analysis, as modified by the second source of input image frames, for example including an overlay originating from the second source of input image frames. Meanwhile, such a decoder will disregard the encoded image frames of the first set of encoded image frames, designated as image frames not to be displayed. Thus, the combined video stream will be usable without modification when decoded using such a standard video decoder, allowing for easy playback including the overlays, which may be a common use of the combined video stream. Meanwhile, all information from the first source of input image frames, without modification, is included in the combined video stream and may be extractable therefrom using a decoder, specially adapted therefore, which may extract the encoded image frames designated as image frames not to be displayed from the combined video stream and outputs those image frames, as decoded, in the decoded video stream. Thus, in summary, this allows for encoding the combined video stream in a way that is easy to use, while still including all information from both sources, as signed by the first key and the second key.

The first source of input image frames may be an image sensor of a video capture device. This may result in that the first set of input image frames are encoded as captured without any modification applied.

The second source of input image frames may be another sensor than the image sensor of the video capture device. Another sensor than the image sensor may, e.g., be an infra-red sensor, a radar sensor, a laser/lidar sensor, etc. As such, a graphical overlay based on other sensor data, e.g., radar data, may be incorporated into the combined video stream without affecting the first set of input image frames.

The second source of input image frames may be a video processing unit. Such a video processing unit may be understood as any device, method, system, or software, capable of relevant processing of video such as e.g., an encoder. Other devices, methods, or systems capable of making modifications to image frames or video may also be considered a video processing unit. The video processing unit may be computer implemented. For example, the video processing unit may have been implemented utilizing an application programming interface, API, associated with the first source of image data. The video processing unit may be a video processing pipeline.

The video processing unit may comprise a graphical overlay adding function. Such a graphical overlay adding function should be understood as any device, method, or system capable of adding a graphical overlay of any sort onto image frames.

The first key may be a hash function key, and/or the second key may be a hash function key. This may be understood as the first and/or second keys relating to a cryptographic hash function. Hash keys provide increased security by reducing the probability or feasibility of unauthorized or malicious-intent signing to occur without said signing being detected as such.

The encoding may comprise inter encoding the first set of input image frames and the second set of input image frames into, respectively, the first set of encoded image frames and the second set of encoded image frames.

The encoding may comprise prediction encoding the first set of input image frames and the second set of input image frames into, respectively, the first set of encoded image frames and the second set of encoded image frames. Prediction encoding may be understood as being the type of inter frame encoding where preceding image frames are used as reference when encoding any particular image frame.

The method may further comprise associating with the combined video stream at least one of a signature pertaining to the signing using the first key, and a signature pertaining to the signing using the second key. For example, the one or more signatures from the signing may be included in the combined video stream and thus comprised therein. Alternatively, the one or more signatures may be separate from the combined video stream, but associated therewith, for example in a same directory, database, filesystem, storage facility, or the like, or by being transmitted through a same data stream, channel, connection, or the like.

As a signature should be understood a collection of bits or bytes, a string of characters, or the like, resulting from the signing using the respective key.

The method may further comprise decoding, at a decoder, the combined video stream. Such a video decoder may be understood as any device, method, or system capable of decoding video. The decoder may be computer implemented.

The method may further comprise checking a signature comprised in said combined video stream and associating data pertaining to a result of said checking with said decoded video stream.

This allows for a technically particularly efficient way of presenting the result of the signature check to a user.

The method may further comprise determining an origin of an image frame of said combined video stream and associating data based on the determining of the said origin with said image frame.

This allows for a technically particularly efficient way of presenting a result of the determining of the origin to a user.

According to a second aspect, there is provided a non-transitory computer-readable storage medium having stored thereon instructions for implementing the method according to the first aspect, when executed on a device having processing capabilities.

The second aspect may provide similar advantages as the first aspect due to their inherent relationship.

According to a third aspect, there is provided a video processing system comprising a processor configured to receive a first set of encoded image frames, comprising image data originating from a first source of input image frames; receive a second set of encoded image frames, comprising image data originating from a second source of input image frames; encode the first set of input image frames and the second set of input image frames into, respectively, a first set of encoded image frames and a second set of encoded image frames, forming a combined video stream, wherein an encoded image frame of the first set of encoded image frames exclusively references one or more image frames of the first set of encoded image frames, and wherein an encoded image frame of the second set of encoded image frames references both an encoded image frame of the first set of encoded image frames and another encoded image frame of the second set of encoded image frames, sign, using a first key, a first signing group comprising one or more encoded image frames of the first set of encoded image frames, wherein the first key pertains to the first source of input image frames; sign, using a second key, a second signing group comprising one or more encoded image frames of the second set of encoded image frames, wherein the second key pertains to the second source of input image frames.

The third aspect may provide similar advantages as the first aspect due to their inherent relationship.

The video processing system may further comprise a decoder, configured to decode the combined video stream.

A further scope of applicability will become apparent from the detailed description given below. However, it should be understood that the detailed description and specific examples, while indicating preferred embodiments, are given by way of illustration only, since various changes and modifications within the scope of the claims will become apparent to those skilled in the art from this detailed description.

Hence, it is to be understood that is the concepts are not limited to the particular component parts of the device described or acts of the methods described as such device and method may vary within the scope of the claims.

BRIEF DESCRIPTION OF THE DRAWINGS

The above and other aspects of the present concepts will, in the following, be described in more detail with reference to appended figures. The figures should not be considered limiting; instead they should be considered for explaining and understanding purposes.

As illustrated in the figures, the sizes of layers and regions may be exaggerated for illustrative purposes and, thus, are provided to illustrate the general structures. Like reference numerals refer to like elements throughout.

DETAILED DESCRIPTION

The present concepts will now be described more fully hereinafter with reference to the accompanying drawings, in which currently preferred embodiments are shown. This concepts may, however, be practiced in many different forms within the scope of the claims and should not be construed as limited to the embodiments set forth herein.

Figure 1:
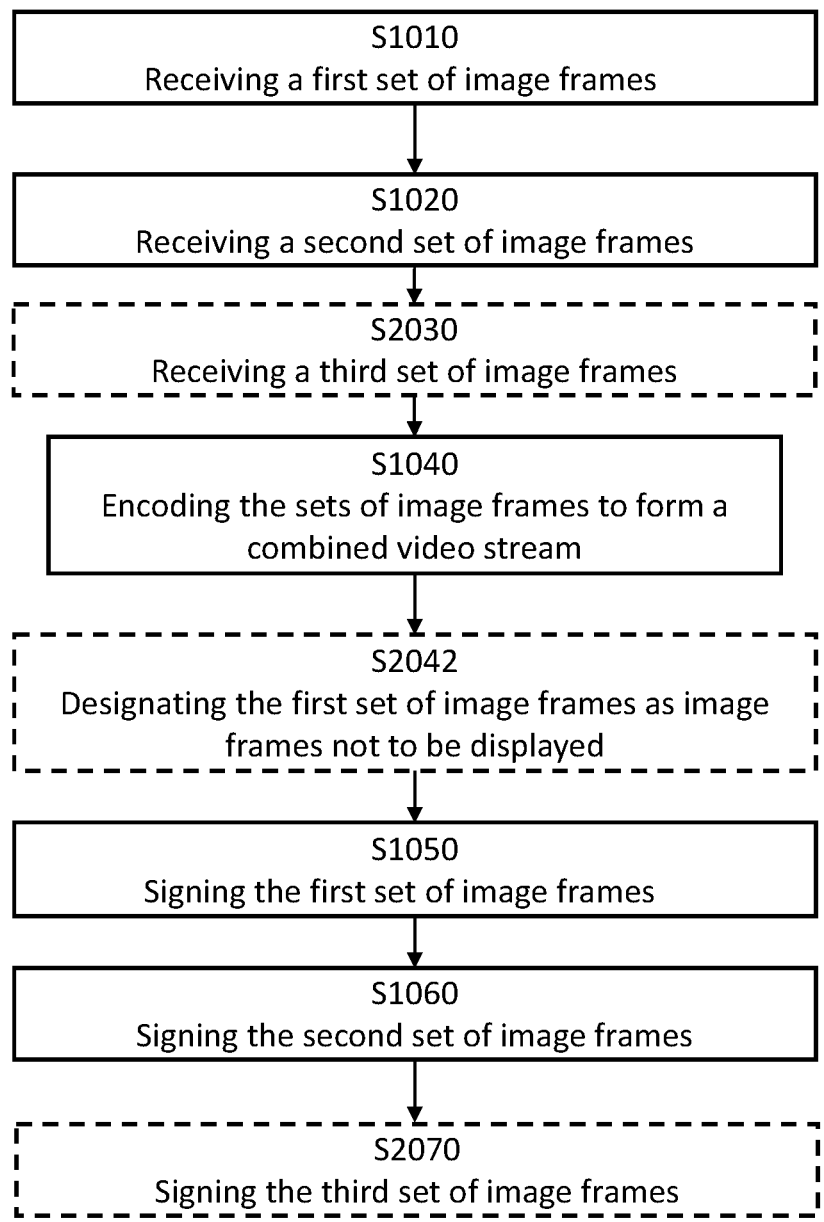
FIG. 1 shows a flowchart for a method example of processing a video stream.
Figure 5:
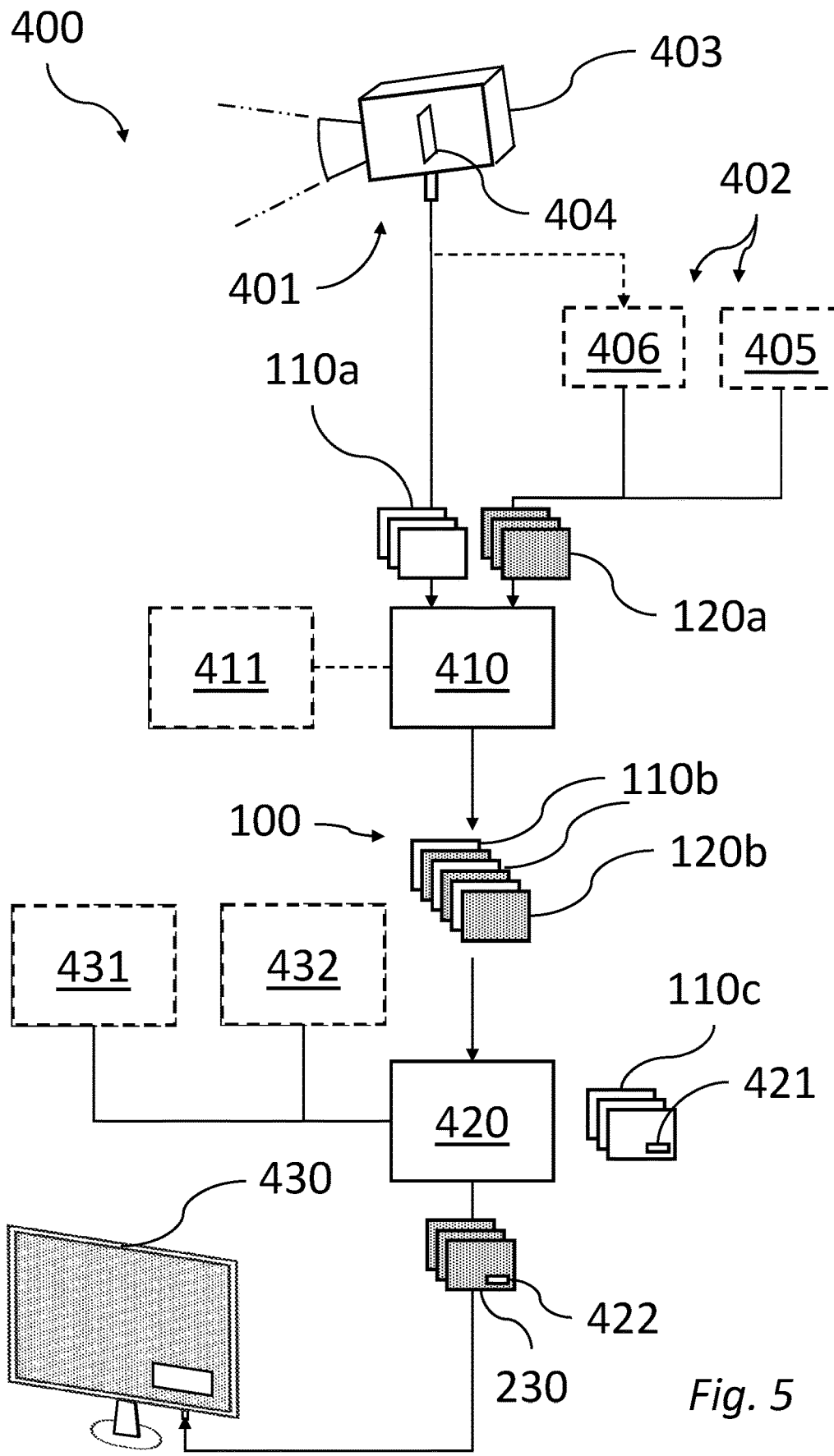
FIG. 5 shows a video processing system and components thereof.

FIG. 1 shows a method example of processing a video stream. In parallel, reference is made to FIG. 5, showing a video processing system 400 configured for carrying out the method example.

Additional steps, optional for the method example, are illustrated as boxes with dashed borders in the flowcharts of this disclosure, including FIG. 1. Arrows between boxes indicate an example of an order for performing the steps but should not be understood as excluding other alternatives for ordering the steps.

At S1010, a first set of input image frames 110a is received. The first set of input image frames 110a comprises image data originating from a first source of input image frames 401 (cf. FIG. 5) and may be received at an encoder 410 (cf. FIG. 5).

At S1020, a second set of input image frames 120a is received. The second set of input image frames 120a (cf. FIG. 2) comprises image data originating from a second source of input image frames 402 (cf. FIG. 5) and may also be received at the encoder 410 (cf. FIG. 5).

At S1040, at the encoder 410, the first set of input image frames 110a and the second set of input image frames 110a are encoded, into, respectively, a first set of encoded images frames 110b and a second set of encoded image frames 120b to form a combined video stream 100 (cf. FIG. 5). Encoding may be performed into a bitstream according to a video coding format and/or standard such as, e.g., H.261, H.262, H.263, H.264/AVC, H.265/HEVC, VP8, VP9, or AV1.

At S1050, a first signing group, comprising one or more encoded image frames of the first set of encoded image frames 110b is signed using a first key. The first key pertains to the first source of input image frames 401. The signing may, for example, be performed in an optional separate signing unit 411, at the encoder 410, or elsewhere (cf. FIG. 5).

At S1060, a second signing group comprising one or more encoded image frames of the second set of encoded image frames 110b is signed using a second key. The second key pertains to the second source of input image frames 401. The signing may, for example, be performed in the signing unit 411, at the encoder 410, or elsewhere (cf. FIG. 5).

Figure 2:
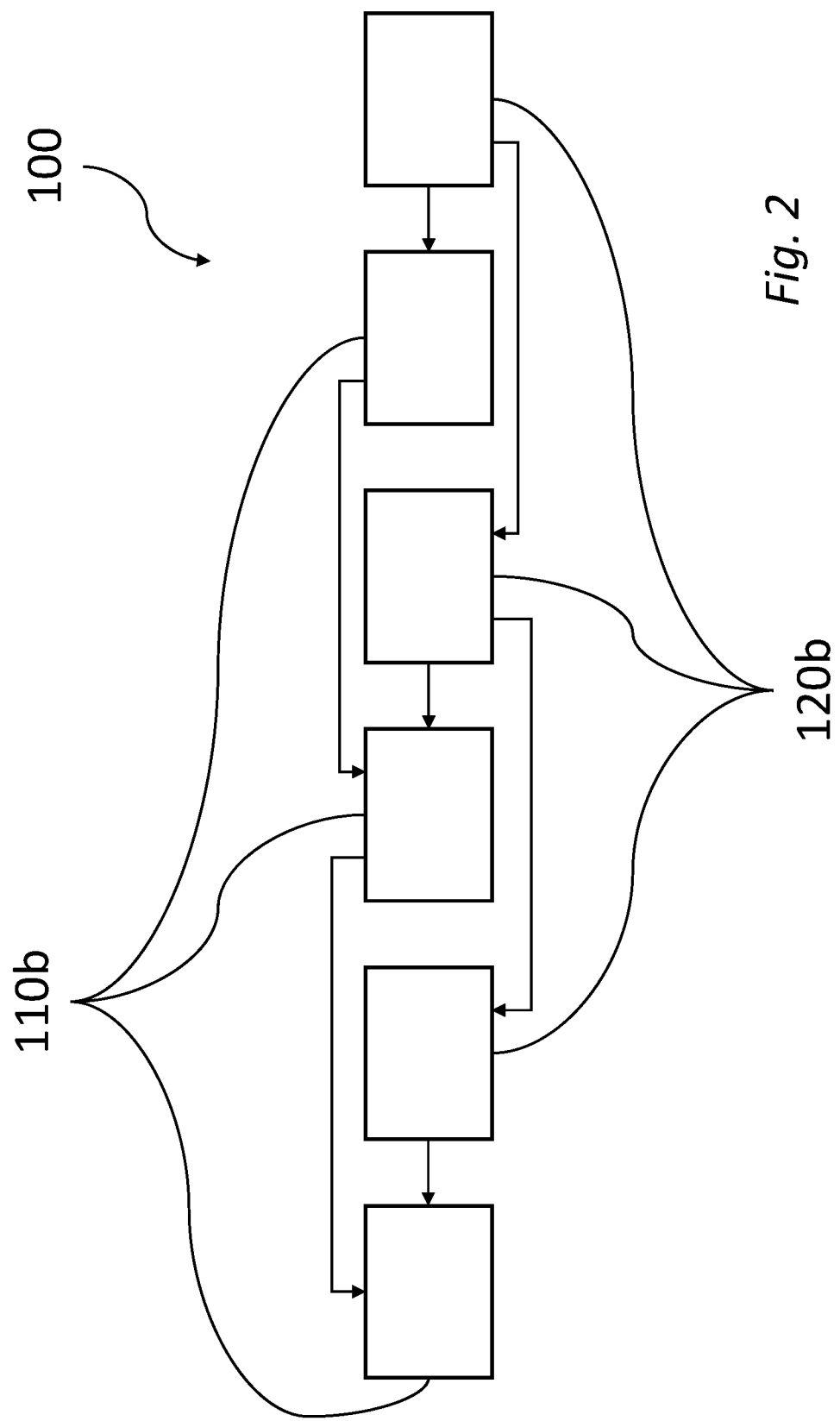
FIG. 2 illustrates a first set and a second set of encoded image frames forming a combined video stream.

FIG. 2 illustrates how the first set of encoded image frames 110b and the second set of encoded image frames 120b may be arranged in the combined video stream 100 and how the respective frames reference each other. References in the figure are indicated by arrows and the figure should be understood as corresponding to a chronological sequence of image frames, with the leftmost image frame being the first image frame and the rightmost image frame being the last image frame.

One frame referencing another frame may, for example, correspond to prediction-type inter frame encoding as known per se in the field of video encoding.

Still with reference to FIG. 2, as can be seen therein, an image frame—in this example each image frame—of the first set of encoded image frames 110b exclusively references another image frame of the first set of encoded image frames 110b.

Further, in this example, each image frame of the first set of encoded image frames exclusively references the preceding image frame comprised in the first set of encoded image frames 110b, although other configurations are equally possible, such as an image frame, or each image frame, of the first set of encoded image frames exclusively references a plurality of previous image frames of the first set of encoded image frames 110b, or a frame of the first set of encoded image frames 110b exclusively referencing one or more other images frames of the first set of encoded images frames 110b both forwards and backwards in time.

FIG. 2 further illustrates how an image frame of the second set of encoded image frames 120b references both an image frame of the first set of encoded image frames 110b and another image frame of the second set of encoded image frames 120b.

Thus, the encoding S1040 may comprise prediction encoding the first set of encoded image frames 110b and the second set of encoded image frames 120b to form the combined video stream 100.

For example, the first set of input image frames 110a may comprise original image data, or original pixel data, as captured by a video capture device 403 (cf. FIG. 5).

Again with reference to FIGS. 1 and 5, the first source of input image frames 401 may be an image sensor 404. The first source of input image frames 401 may be an image sensor 404 of a video capture device 403. The first source of input image frames 401 may be part of, or associated with, the video capture device 403 in other ways as well. The first source of input image frames 401 may be a source of original image data, or original pixel data, as captured by the video capture device 403. The first source of input image frames 401 may be directly associated with the image sensor 404 or the video capture device 403.

The video capture device 403 may comprise the image sensor 404. The video capture device 403 may be configured and/or arranged to be in electrical and/or wireless connection with the image sensor 404. The video capture device 403 may be adapted or configured to capture video, i.e., a sequence of subsequent image frames. The video capture device 403 may alternatively be referred to or understood as a video camera. The video capture device 403 may be digital type video capture device. The video capture device 403 may be a monitoring and/or surveillance type video capture device. The video capture device 403 may be a surveillance type video capture device. The video capture device 403 may be a pan/tilt/zoom type video capture device. The video capture device 403 may be a static or fixed video capture device. The video capture device 403 may be a portable or wearable video capture device.

The video capture device 403 may comprise a medium for storing captured image data and/or image frames. The video capture device 403 may comprise a transmitter arranged and/or configured to transmit captured image data and/or image frames.

The video capture device 403 may be a network connected type video capture device. The video capture device 403 may be optically, electrically, or wirelessly connected to a network. The network may e.g., be a local area network, LAN, type network, a wide area network, WAN, type network, or a wireless local area network, WLAN, type network.

The image sensor 404 may be part of the video capture device 403. The image sensor 404 may be a complementary metal-oxide-semiconductor, CMOS, type image sensor. The image sensor 404 may be a charge-coupled device, CCD, type image sensor. The image sensor 404 may be an active-pixel sensor, APS, type image sensor. The image sensor 404 may be a silicon-based image sensor.

As an example, the first set of input image frames 110a may comprise unmodified or unedited image data, such as not having been modified, edited and/or tampered with since captured.

Alternatively, the first set of input image frames 110a may, in addition, comprise additions to the image data as captured, for example overlays added in a surveillance camera, and/or by a same originator as the captured image data. Hereby, in this case, the captured image data, with any possible additions, forming the first set of input image frames 112a, may be seen as originating from a first source of input image frames.

The second set of input image frames 120a may comprise edited or modified image data, or pixel data. The second set of input image frames 120a may, e.g., comprise a graphical overlay element, e.g., a bounding box, a privacy mask, an indicator, a message, or another type of overlay information in the form of text, numerals, symbols, etc. For example, such overlay information may relate to sensor data, such as from another sensor 405, as further exemplified below. The second set of input image frames 120a may be based on the first set of input image frames 110a. The second set of input image frames 120a may, e.g., comprise image frames of the first set of input image frames 110a with graphical overlay elements added to the image frames. The second set of input image frames 120a may thus be understood to comprise modifications, edits, and/or alterations with respect to the image data from the first source of input image frames, e.g., as captured by the video capture device 403.

The modifications, edits, or alterations of image data comprised in the second set of input image frames 122a, as compared to the first set of input image frames 112a, may be based on analysis or evaluation of the first set of input image frames 110a. For example, image analysis algorithms may be used to create a privacy mask to obscure certain parts of the image frames of the first set of input image frames 110a. The privacy mask may then be applied to an otherwise empty image frame or to a copy of the image frame from the first set of input image frames 110a. The image frames with the privacy mask may then correspond to the second set of input image frames 120a.

The second source of input image frames 402 may be another sensor 405 than the image sensor 404 of the video capture device 403. The second source of input image frames 402, e.g., the another sensor 405, may be part of the video capture device 403, and/or be housed within a same housing as the image sensor 404. The second source of input image frames 402 may alternatively be physically separate and/or located at least some distance from the first source of input image frames 401 or the video capture device 403.

The another sensor 405 may be another image sensor. The another sensor 405 may be an infrared, IR, type sensor e.g., an IR image sensor of an IR camera or IR video capture device. The another sensor 405 may be a light sensor. The another sensor 405 may be a radio detection and ranging, radar, type sensor. The another sensor 405 may be a light detection and ranging, LIDAR, type sensor. The another sensor 405 may be a motion sensor. The another sensor 405 may be a 3-D imaging sensor, adapted to make 3-D representations of a scene being imaged, a thermal camera, or a spectrometer. The first key may pertain to, be associated with, or in another way relate to the first source of input image frames 401. The first key may be an individual key, related to a single first source of input image frames 401, e.g., a unique video capture device 403. The first key may alternatively be a key shared for a plurality of first sources of image frames 401.

The first key may belong to, or be associated with, an entity that develops, manufactures, provides, and/or maintains the first source of input image frames 401, e.g., the video capture device 403. The first key may be securely and/or exclusively accessible to the same entity. The first key may belong to or be associated with a judicial or governmental entity that oversees or regulates how captured image data is used or handled within the relevant jurisdiction. The first source of input image frames 401 may be associated with the same entity.

The first key may be a first private key, paired with a first public key, according to the principles of public key cryptography, as known per se. The first private key and the first public key may be generated, or have been generated, at the first source of input image frames 401.

As an example, the signing S1050 of the first signing group with the first key may comprise calculating a hash of the image data of the one or more encoded image frames of the first set of encoded image frames 110b comprised in the first signing group, and encrypting the resulting hash using the first private key.

The hash function may be a cryptographic hash function. The hash function may be a secure hash algorithm, SHA, or a digital signature algorithm, DSA, type hash function. The hash function may be a SHA-0, SHA-1, SHA-2, SHA-3, etc. type hash function.

The signing S1050 with the first key may result in a signature, which may be collection of bits or bytes, a string of characters, or the like, resulting from the signing using the first key. The signature, thereby pertaining to the signing S1050 with the first key, may be associated with the combined video stream 100. Optionally, the public key may as well be associated with the combined video stream 100. For example, the one or more signatures from the signing and/or the public key may be included in the combined video stream and thus comprised therein. Alternatively, for example, the signature and/or public key may be separate from the combined video stream 100, but associated therewith, for example in a same directory, database, filesystem, or storage facility, or by being transmitted through a same data stream, channel, connection, or the like.

The second key may pertain to, be associated with, or in another way relate to the second source of input image frames 402. The second key may be an individual key, related to a second first source of input image frames 402. The second key may alternatively be a key shared for a plurality of second sources of image frames 402.

The second key may belong to or be associated with the entity that develops, manufactures, provides, and/or maintains the first source of input image frames 401 and/or an entity that does the same for the second source of input image frames 402. Typically, these two entities may be different, but they may also be the same.

The second key may belong to, or be associated with, a third-party entity, other than the entity that develops, manufactures, provides, and/or maintains the first or second sources of image frames 401, 402. The second key may belong to, or be associated with, a judicial or governmental entity that oversees or regulates how captured image data is used or handled within the relevant jurisdiction. The second key may be securely and/or exclusively accessible to one of the above-mentioned entities.

The second key may, similarly to the first key, be a second private key paired with a second public key, as known per se in public key cryptography. Just as for the signing S1050 with the first key, the signing S1060 with the second key may result in a signature. The signature, thereby pertaining to the signing S1050 with the second key, may be associated with the combined video stream 100, for example through including the signature in the combined video stream. Optionally, the second public key may as well be associated with the combined video stream 100. Alternatively, the signature and/or second public key may be associated with the combined video stream 100 in some other way, as exemplified above in conjunction with the signing S1050 with the first key.

The second source of input image frames 402 may be a video processing unit 406 (cf. FIG. 5). The video processing unit 406 may produce image data pertaining to, or image frames comprising, graphical overlay elements such as e.g., bounding boxes, privacy masks, indicators, messages, or other overlay information in the form of text, numerals, symbols, etc.

The video processing unit 406 may be adapted or configured to process images captured by the first source of input image frames 401 into some form of image data.

The video processing unit 406 may comprise a graphical overlay adding function. The graphical overlay adding function may be configured or adapted to add graphical overlay elements to image frames of e.g., the first set of input image frames 110a.

The encoder 410 (cf. FIG. 5) may be a physical hardware-based encoder relying on its hardware for performing encoding. The encoder 410 may be a software-based encoder relying on its programming or code for performing encoding. The encoder 410 may also be a combination of the two. The encoder 410 may be incorporated with the video capture device 403. The encoder 410 may e.g., be located within the same physical housing as the video capture device 403. The encoder 410 may be configured and/or arranged to be in electrical and/or wireless connection with the video capture device 403. The encoder 410 may be a standard encoder.

Still with reference to FIG. 1, the method example may further comprise receiving S2030, at the encoder 410, a third set of input image frames 132a, comprising image data originating from a third source of input image frames.

The method example may further comprise signing S2070, in a separate unit, such as the signing unit 411, or at the encoder 410, or elsewhere the third set of encoded image frames 130 using a third key. The third key may pertain to the third source of input image frames.

The signing S1050, S1060, S2070 is performed for a signing group comprising one or more image frames. Typically, a signing group may correspond to the image frames of the respective set of encoded image frames in a group of pictures (GOP), the concept of which being known per se in the field of video encoding, in the combined video stream. Alternatively, signing may be performed on a per-frame basis. In that case, the signing group corresponds to the frame signed.

The second signing group may exclusively comprise encoded image frames of the second set of image frames. Alternatively, the second signing group may comprise image frames from both the first set of encoded image frames and the second set of image frames, wherein one or more encoded image frames of the first set of encoded image frames in the second signing group is referred to by an encoded image frame of the second set of encoded image frames in the second signing group.

The signing S1050, S1060, S2070 may be performed after or in parallel with the encoding S1040 and this disclosure should not be understood as excluding either alternative.

The signing may be performed by a signing function of the signing unit 411, or of the encoder 410.

Figure 3:
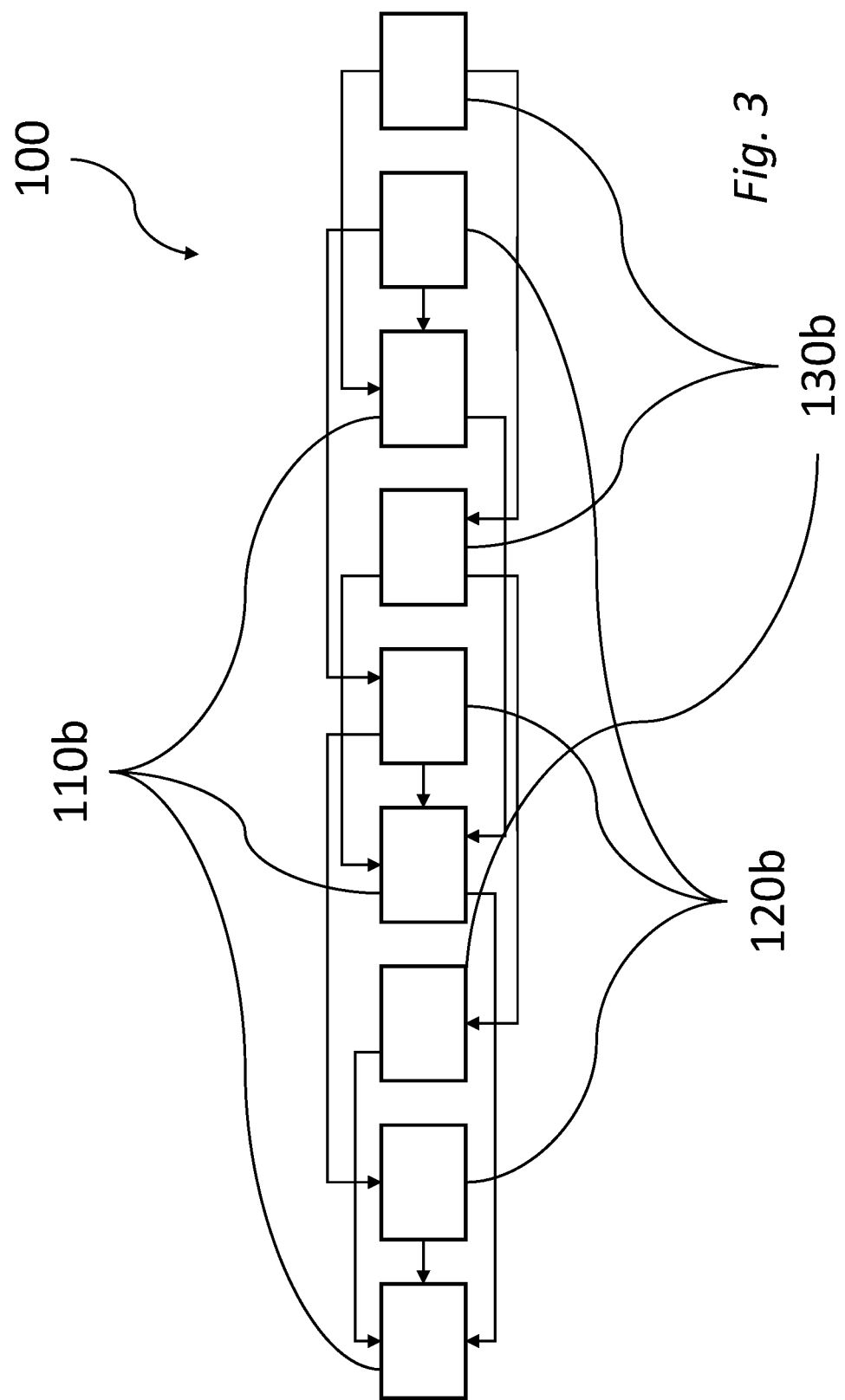
FIG. 3 illustrates a first set, a second set, and a third set of encoded image frames forming a combined video stream.

FIG. 3 illustrates how the encoding S1040 the first set of input image frames 110a and the second set of input image frames 120a may further comprise encoding the third set of input image frames 130a into a third set of encoded image frames 130b to form the combined video stream 100. The figure illustrates how an image frame of the third set of encoded image frames 130 may reference both an image frame of the first set of encoded image frames 110b and another image frame of the third set of encoded image frames 130.

References in FIG. 3 are, as with the case of FIG. 2, indicated by arrows and the figure should be understood as corresponding to a chronological sequence of image frames, with the leftmost image frame being the first image frame and the rightmost image frame being the last image frame.

FIG. 3. shows how the first set, the second set, and the third set of encoded image frames 110b, 120b, 130b may be arranged in the combined video stream 100, and how the respective image frames reference each other. Referencing in the first set of encoded image frames 110b and the second set of encoded image frames 120b are as described above in conjunction with FIG. 2. Further, an encoded image frame, as shown for all frames of the third set of encoded image frames 130b, may reference both an encoded image frame of the first set of encoded image frames 110b and another encoded image frame of the third set of encoded image frames 130b.

This may be understood as the encoding S1040 comprising inter encoding the first set of input image frames 112a, the second set of input image frames 122a, and, optionally, the third set of input image frames 130a into, respectively, the first 110b, second 120b, and third 130b set of encoded image frames in the combined video stream 100.

The encoding S1040 may comprise prediction encoding the first set of input image frames 112a, the second set of input image frames 122a, and, optionally, the third set of input image frames 130a into, respectively, the first 110b, second 120b, and third 130b set of encoded image frames in the combined video stream 100.

The third set of input image frames 130a may be understood in a same manner as the second set of input image frames 120a. The third set of input image frames 130a may, e.g., comprise additional or different image data than that present in the first set of input image frames 112a, i.e., the original image data, or the second set of input image frames 120a.

The third source of input image frames may be understood as an additional or further source of input image frames, similar or identical in its content or use, to the first and second source image frames 401, 402.

The third key may, be understood in a same manner as the second key. The third key may pertain to, be associated with, or in another way relate to the third source of input image frames. The third key may be an individual key, related to a third first source of input image frames. The second key may alternatively be a key shared for a plurality of third sources of image frames 402. The third key may, similarly to the first and second keys, be a hash function key.

Just as for the signing S1050 with the first key and the signing S1060 with the second key, the signing S2070 with the third key may result in a signature, which, for example, may be a hash. The signature, thereby pertaining to the signing S2070 with the third key, may be associated with the combined video stream 100, for example through including the signature in the combined video stream. Alternatively, the signature may be associated with the combined video stream 100 in some other way, as exemplified above.

Further sets of image frames from further sources of image frames with corresponding further keys are entirely possible according to the same principles as the three sets of image frames, sources of image frames and keys disclosed herein.

An example may further comprise designating S2042, at the encoder 401, the first set of encoded image frames 110b as image frames not to be displayed.

Further, the example may further comprise designating, at the encoder 401, the second set of encoded image frames 120b and/or the third set of encoded image frames 130b as image frames to be displayed.

Hereby, image frames of any of the sets of encoded image frames 110b, 120b, 130b may be designated, marked, or tagged, for instance as not to be displayed, i.e., no-display, in accordance with the used video coding format.

Such designating of image frames not to be displayed, may, for example, take the form of an ND (No Display) flag in the respective frame, as defined in video coding standards such as H.265, H.266/VVC, EVC, and AV1.

Image frames of any of the sets of image frames 110b, 120b, 130b may alternatively be designated, marked, or tagged as to be displayed, i.e., display, in accordance with the used video coding format. Designating, marking, or tagging may be performed on encoded image frames.

Tagging the first set of encoded image frames, for instance with an ND flag, provides a possibility to include the signed first set of encoded image frames 110b in the combined video stream 100 in a way that will result in them not being included in an output video stream when decoded with a conventional decoder. Rather, then, the decoded image frames, containing the combined image data of the first and second set of image frames due to the referencing, will be included in the output video stream from the decoder. The same applies in a situation where also a third set of encoded image frames 103b are included in the combined video stream 100.

In practice, a standard decoder would not forward or transmit image frames designated, marked, or tagged as no-display image frames to an output video stream for instance for display, analytics or for storage. Conversely, the standard decoder would forward or transmit image frames designated, marked, or tagged as display image frames to an output video stream for instance for display, analytics or for storage.

Figure 4:
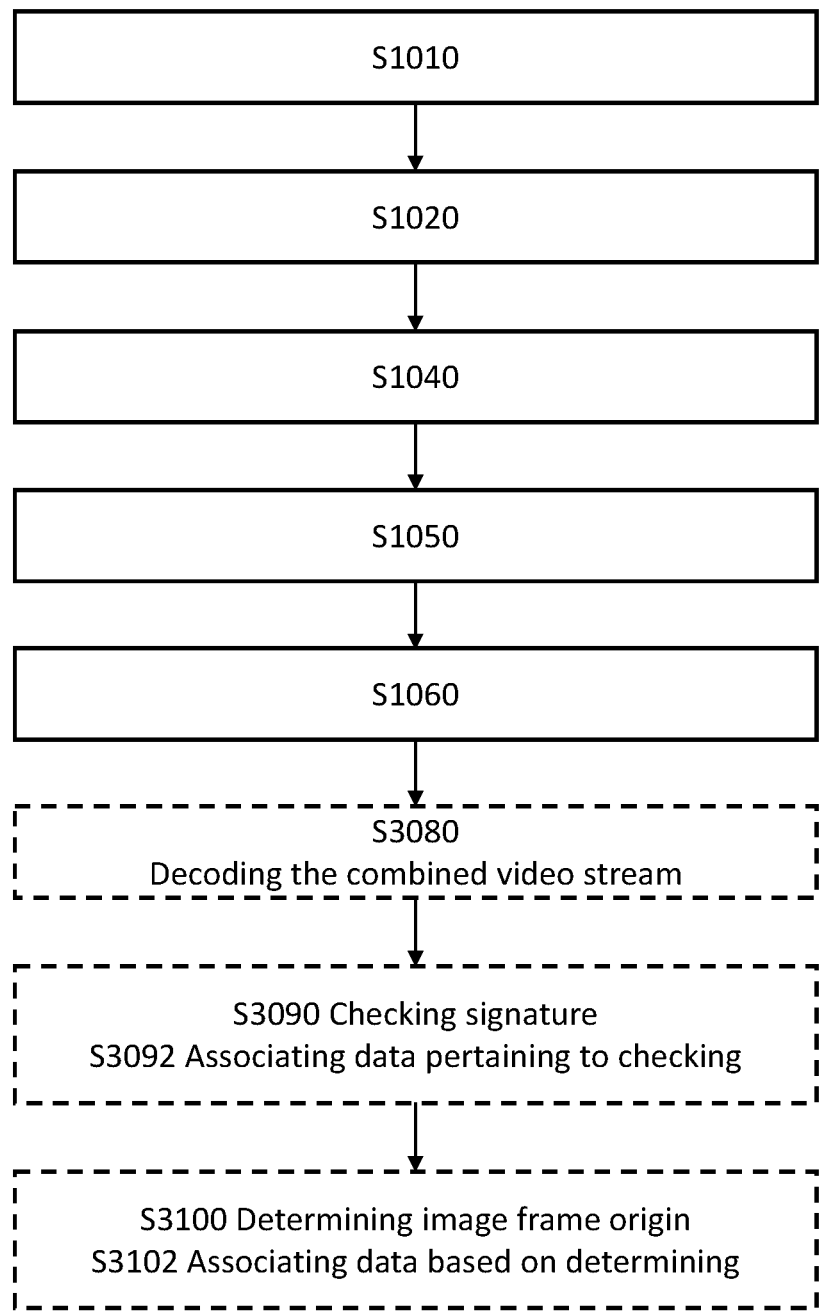
FIG. 4 shows a flowchart for a method example of processing a video stream comprising further steps.

FIG. 4 shows the method example of processing a video stream comprising additional optional steps in addition to what disclosed above in conjunction with FIG. 1.

The example may further comprise decoding S3080, at a decoder 420 (cf. FIG. 5), the combined video stream 100.

For example, the decoding may result in a decoded video stream comprising a decoded set of image frames 230 (cf. FIG. 5). The decoded set of image frames 230 may correspond to the first set of input image frames 112a, as modified by the second set of input image frames 120a. This may, for example, be the case of the decoder 420 operating as a standard decoder.

Additionally, or alternatively, the decoding may result in another decoded video stream comprising another set of decoded image frames 110c (cf. FIG. 5) directly corresponding to the first set of input image frames 112a, for example through the decoder 420 extracting frames tagged not to be displayed from the combined video stream, as described above.

The decoder 420 may be a physical hardware-based decoder relying on its hardware for performing decoding. The decoder 420 may be a software-based decoder relying on its programming or code for performing decoding. The decoder 420 may also be a combination of the two. The decoder 420 may be incorporated with the video capture device 403, a storage unit, a display unit 430, or a display device. The decoder 420 may e.g., be located within the same physical housing as the video capture device 403, the storage unit, the display unit 430, or the display device. The decoder 420 may be configured and/or arranged to be in electrical and/or wireless connection with the video capture device 403, the storage unit, the display unit 430, and/or the display device. The decoder 420 may be a standard decoder.

A checking S3090 of image frame signature or signing may be performed prior to, in parallel with, or after the decoding S3080.

The checking S3090 of the image frame signature may use the public key corresponding to the private key used when signing. The public key may have been retrieved from the combined image stream 100. Alternatively, the public key may have been stored together with a corresponding image source identifier, such as a camera identifier, ready to use at a time when the transmitted video data needs validation.

The checking S3090 may comprise decrypting a hash, comprising the signature, using the public key, making the result of the hashing available again. A further hash may be calculated based on received image data, using the same hashing algorithm as used during singing, and the resulting further hash may be compared with the decrypted hash to verify both the identity of the sender as well as that the video data has not been modified.

The checking may be performed per signing group, such as on a per-GOP or per-frame basis. The checking may be performed by a signing checker unit 431. The check may issue a signing result. The result may, for example, be in the form of an ok or not ok result. Based on the result, such as the ok or not ok, the signing checker unit 431 or the decoder 420 may place S3092 a corresponding marker 421, 422 chosen according to and pertaining to the respective ok or not ok status in the decoded image frame, for example as part of the decoded set of image frames 230 or the another set of decoded image frames 110c. Thus, the nature of the marker constitutes data pertaining to the result of the checking and that data is associated with the decoded video stream of which the image frame forms part.

The decoder 420 or a storage device, or a display device or a video playback device may comprise said signing checker unit 431 (cf. FIG. 5). The signing checker unit 431 may be connected communicatively, e.g., by electrical or wireless connection, to the decoder 420. The signing checker unit 431 may be physically connected to or integrated with the decoder 420.

A determining S3100 of image frame origin or authenticity of origin may be performed prior to, in parallel with, or after performing decoding S3080. This check may be performed on a per frame basis and may, for example, be based on whether the frame was designated as an image not to be displayed, or not designated as an image not to be displayed. Alternatively, the origin check may be based on a signature in the combined video stream.

The origin check may be performed by an origin checker unit 432 (cf. FIG. 5), or in the decoder 420. If the frame was designated as an image frame not to be displayed, the origin check may determine that the image frame originated from the first source of input image frames. If the frame was not designated as an image frame not to be displayed, the origin check may determine that at least parts of the image frame originated from the second source of input image frames.

Based on the determining whether the image frame originated from the first source of image frames of the second source of image frames by the origin checker unit 432, the origin checker unit 432 or the decoder 420 may place S3012 a marker 421 pertaining to the first source of image frames or a marker 422 pertaining to the second source of image frames in the image frame.

Thus, the marker 421, 422 constitutes data based on the result of the determining S3010 and that data is associated with the image frame in the form of the marker 421, 422.

The decoder 420 or a display device or a video playback device may comprise said origin checker unit 432. The origin checker unit 432 may be connected communicatively, e.g., by electrical or wireless connection, to the decoder 420. The origin checker unit 432 may be physically connected to or integrated with the decoder 420.

Alternative to, or in addition to, the marker 421, 422, the data pertaining to the result of the signature checking and/or the data based on the determining of the origin may be added into a header of an image frame of the set of decoded image frames 110c, 230. The data may be added into a log of an image frame of the set of decoded image frames 110c. The data may be added into metadata of an image frame of the set of decoded image frames 110c, 230.

The marker 421, 422 may be added directly into an image frame of the set of decoded image frames 110c, 230 as changed pixel values. The marker 421, 422 may comprise a graphical overlay element, e.g., a bounding box, a privacy mask, an indicator, a message, or another type of overlay information in the form of text, numerals, symbols, etc. The marker 421, 422 may be added near to a corner, and/or near to an edge, of an image frame of the set of decoded image frames 110c, 230.

The data may be configured to cause a decoder 420 or a display device or unit playing back the decoded combined video stream to prepare a predefined marking by modifying pixels of an image frame of the set of decoded image frames 110c, 230. The marker 421 may be configured to indicate the origin of image frames. The marker 421, 422 may be configured to indicate if the first source of input image frames 401 is the genuine origin of the set of decoded image frames 110c, 230 or if it is not.

The marker 421, 422 may comprise an icon, image, and/or logotype associated with the first source of input image frames 401. The marker 421, 422 may comprise color coding, for indicating if the first source of the image frames 401 is the genuine origin of the set of decoded image frames 110c, 230 or not, e.g., the marker 421, 422 colored green may indicate that the first source of the image frames 401 is the genuine origin of the set of decoded image frames 110c, 230 and added marker 421 colored red may indicate otherwise.

The data, e.g., the marker 421, 422, may be adapted or configured to indicate to an operator viewing the video stream that the image frames in question have or have not been modified, edited, or altered since capture.

In some embodiments, no data is added if the first source of the image frames 401 is determined as the genuine origin of the set of input image frames 110a. In this case, data may only be added if the first source of the image frames 401 is not determined as the genuine origin of the set of input image frames 110a.

The teachings described above may be computer implemented. For this, a non-transitory computer-readable storage medium may be provided. The non-transitory computer-readable storage medium comprises instructions, stored thereon, for implementing the method example, when executed on a device having processing capabilities.

The non-transitory computer-readable storage medium and/or the device having processing capabilities may be part of or may be connected communicatively, e.g., by electrical and/or wireless connection, to the encoder 410 and/or the decoder 420. The non-transitory computer-readable storage medium and/or the device having processing capabilities may be physically connected to and/or integrated with the encoder 410 and/or the decoder 420.

Additionally, variations to the disclosed embodiments can be understood and effected by the skilled person in practicing the concepts, from a study of the drawings, the disclosure, and the appended claims.

The invention claimed is:

1. A method of processing a video stream comprising:
receiving a first set of input image frames comprising image data originating from a first source of input image frames;
receiving a second set of input image frames comprising image data originating from a second source of input image frames, wherein the second set of input image frames includes modifications or changes relative to the first set of image frames;
encoding the first set of input image frames and the second set of input image frames into, respectively, a first set of encoded image frames and a second set of encoded image frames, forming a combined video stream, wherein an encoded image frame of the first set of encoded image frames exclusively references one or more other encoded image frames of the first set of encoded image frames, and wherein an encoded image frame of the second set of encoded image frames references both an encoded image frame of the first set of encoded image frames and another encoded image frame of the second set of encoded image frames;
designating the first set of encoded image frames as image frames not to be displayed or designating the second set of encoded image frames as image frames to be displayed;
signing, using a first key, a first signing group comprising one or more encoded image frames of the first set of encoded image frames, wherein the first key pertains to the first source of input image frames; and
signing, using a second key, a second signing group comprising one or more encoded image frames of the second set of encoded image frames, wherein the second key pertains to the second source of input image frames.

2. The method according to claim 1, wherein the second signing group further comprises one or more encoded image frames of the first set of encoded image frames referred to by an encoded image frame of the second set of encoded image frames.

3. The method according to claim 1, further comprising:
receiving a third set of input image frames comprising image data originating from a third source of input image frames, wherein the encoding further comprises encoding the third set of input image frames into a third set of encoded image frames, forming part of the combined video stream, wherein an encoded image frame of the third set of encoded image frames references both an encoded image frame of the first set of encoded image frames and another encoded image frame of the third set of encoded image frames, said method further comprising:
signing, using a third key, a third signing group comprising one or more image frames of the third set of encoded image frames, wherein the third key pertains to the third source of input image frames.

4. The method according to claim 1, wherein the first source of input image frames is an image sensor of a video capture device.

5. The method according to claim 4, wherein the second source of input image frames is another sensor than the image sensor of the video capture device.

6. The method according to claim 1, wherein the second source of input image frames is a video processing unit.

7. The method according to claim 6, wherein the video processing unit comprises a graphical overlay adding function.

8. The method according to claim 1, wherein the first key is a hash function key, and/or wherein the second key is a hash function key.

9. The method according to claim 1, wherein the encoding comprises inter and/or prediction encoding the first set of input image frames and the second set of input image frames into, respectively, the first set of encoded image frames and the second set of encoded image frames.

10. The method according to claim 1, further comprising:
associating with the combined video stream at least one of:
a signature pertaining to the signing using the first key, and
a signature pertaining to the signing using the second key.

11. The method according to claim 1, further comprising:
decoding, at a decoder, the combined video stream;
checking a signature comprised in said combined video stream; and
associating data pertaining to a result of said checking with the decoded video stream.

12. The method according to claim 1, further comprising:
decoding, at a decoder, the combined video stream;
determining an origin of an image frame of said combined video stream;
associating data based on the determining of the said origin with said image frame.

13. A non-transitory computer-readable storage medium having stored thereon instructions for implementing a method, when executed on a device having processing capabilities, the method for processing a video stream comprising:
receiving a first set of input image frames comprising image data originating from a first source of input image frames;
receiving a second set of input image frames comprising image data originating from a second source of input image frames, wherein the second set of input image frames includes modifications or changes relative to the first set of image frames;
encoding the first set of input image frames and the second set of input image frames into, respectively, a first set of encoded image frames and a second set of encoded image frames, forming a combined video stream, wherein an encoded image frame of the first set of encoded image frames exclusively references one or more other encoded image frames of the first set of encoded image frames, and wherein an encoded image frame of the second set of encoded image frames references both an encoded image frame of the first set of encoded image frames and another encoded image frame of the second set of encoded image frames;
designating the first set of encoded image frames as image frames not to be displayed or designating the second set of encoded image frames as image frames to be displayed;
signing, using a first key, a first signing group comprising one or more encoded image frames of the first set of encoded image frames, wherein the first key pertains to the first source of input image frames; and
signing, using a second key, a second signing group comprising one or more encoded image frames of the second set of encoded image frames, wherein the second key pertains to the second source of input image frames.

14. A video processing system comprising a processor configured to:
receive a first set of input image frames, comprising image data originating from a first source of input image frames;
receive a second set of input image frames, comprising image data originating from a second source of input image frames, wherein the second set of input image frames includes modifications or changes relative to the first set of image frames;
encode the first set of input image frames and the second set of input image frames into, respectively, a first set of encoded image frames and a second set of encoded image frames, forming a combined video stream, wherein an encoded image frame of the first set of encoded image frames exclusively references one or more image frames of the first set of encoded image frames, and wherein an encoded image frame of the second set of encoded image frames references both an encoded image frame of the first set of encoded image frames and another encoded image frame of the second set of encoded image frames;
designate the first set of encoded image frames as image frames not to be displayed or designate the second set of encoded image frames as image frames to be displayed;
sign, using a first key, a first signing group comprising one or more encoded image frames of the first set of encoded image frames, wherein the first key pertains to the first source of input image frames;
sign, using a second key, a second signing group comprising one or more encoded image frames of the second set of encoded image frames, wherein the second key pertains to the second source of input image frames.

* * * * *